(12) United States Patent
Amini et al.

(10) Patent No.: US 7,280,658 B2
(45) Date of Patent: Oct. 9, 2007

(54) SYSTEMS, METHODS, AND COMPUTER PROGRAM PRODUCTS FOR ACCELERATED DYNAMIC PROTECTION OF DATA

(75) Inventors: Lisa Amini, Yorktown Heights, NY (US); William R. Belknap, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 09/872,077

(22) Filed: Jun. 1, 2001

(65) Prior Publication Data

US 2002/0184488 A1   Dec. 5, 2002

(51) Int. Cl.
*H04L 9/00* (2006.01)
(52) U.S. Cl. .......................... 380/45; 380/43
(58) Field of Classification Search ............ 380/45, 380/43, 42; 705/51, 57
See application file for complete search history.

(56) References Cited

U.S. PATENT DOCUMENTS

| | | | |
|---|---|---|---|
| 4,531,020 A | 7/1985 | Wechselberger et al. . | 178/22.08 |
| 4,794,644 A | 12/1988 | Philip et al. ................. | 380/23 |
| 4,933,971 A | 6/1990 | Bestock et al. ............... | 380/44 |
| 5,111,504 A | 5/1992 | Esserman et al. ............. | 380/21 |
| 5,363,448 A * | 11/1994 | Koopman et al. ........... | 713/170 |
| 5,659,614 A * | 8/1997 | Bailey, III ................... | 713/165 |
| 5,715,164 A * | 2/1998 | Liechti et al. ............... | 705/410 |
| 5,784,463 A | 7/1998 | Chen et al. ................... | 380/21 |
| 6,021,391 A | 2/2000 | Shyu ............................. | 705/1 |
| 6,105,133 A | 8/2000 | Fielder et al. ............... | 713/169 |
| 6,145,079 A * | 11/2000 | Mitty et al. ................. | 713/170 |
| 6,385,596 B1 * | 5/2002 | Wiser et al. .................. | 705/51 |
| 6,473,858 B1 * | 10/2002 | Shimomura et al. ........ | 713/150 |

OTHER PUBLICATIONS

MPEG Home Page, http://www.cselt.it/mpeg/.
Terry Ritter, *Ritter's Crypto Glossary and Dictionary of Technical Cryptography*, Jan. 19, 1999 Edition., pp. 1-99, http://www.io.com/-ritter/GLOSSARY.HTM.

* cited by examiner

*Primary Examiner*—Kambiz Zand
*Assistant Examiner*—Andrew L Nalven
(74) *Attorney, Agent, or Firm*—Christine H. Smith; Elissa Y. Wang; Janet M. Skafar

(57) ABSTRACT

A system, method, and computer product that accelerates encryption and decryption of data while using both a static key and a dynamic key. The present invention eliminates intermediate decryption of data that is transmitted between computer systems. More particularly, encryption efficiency is improved by eliminating decryption of the statically encrypted data while incorporating the advantages of a dynamic key such as enabling rapid change of the dynamic key. The efficiency improvements reduce the computer resources required to protect the data and therefore stronger data encryption may be enabled with the saved computer resources. End-to-end security of the data is maintained without the need for trusted data servers.

42 Claims, 6 Drawing Sheets

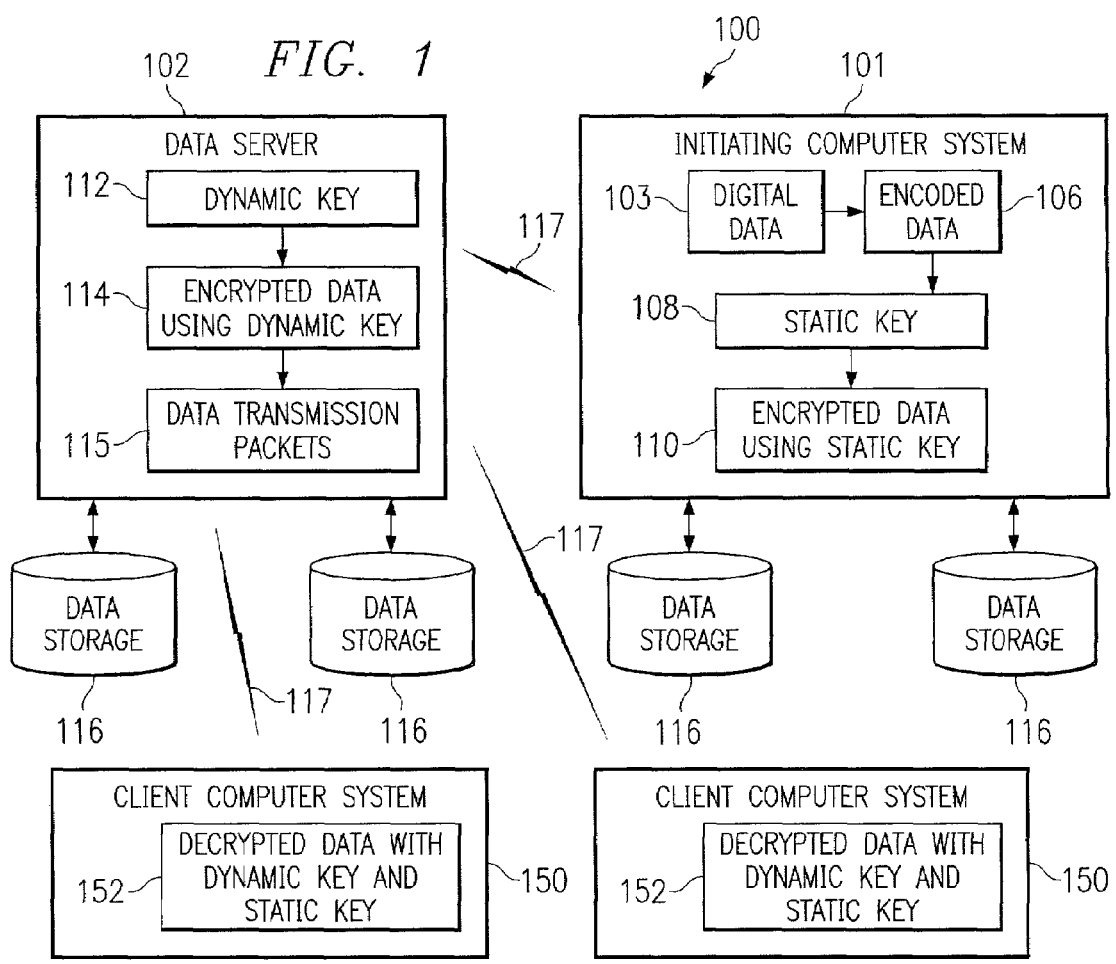
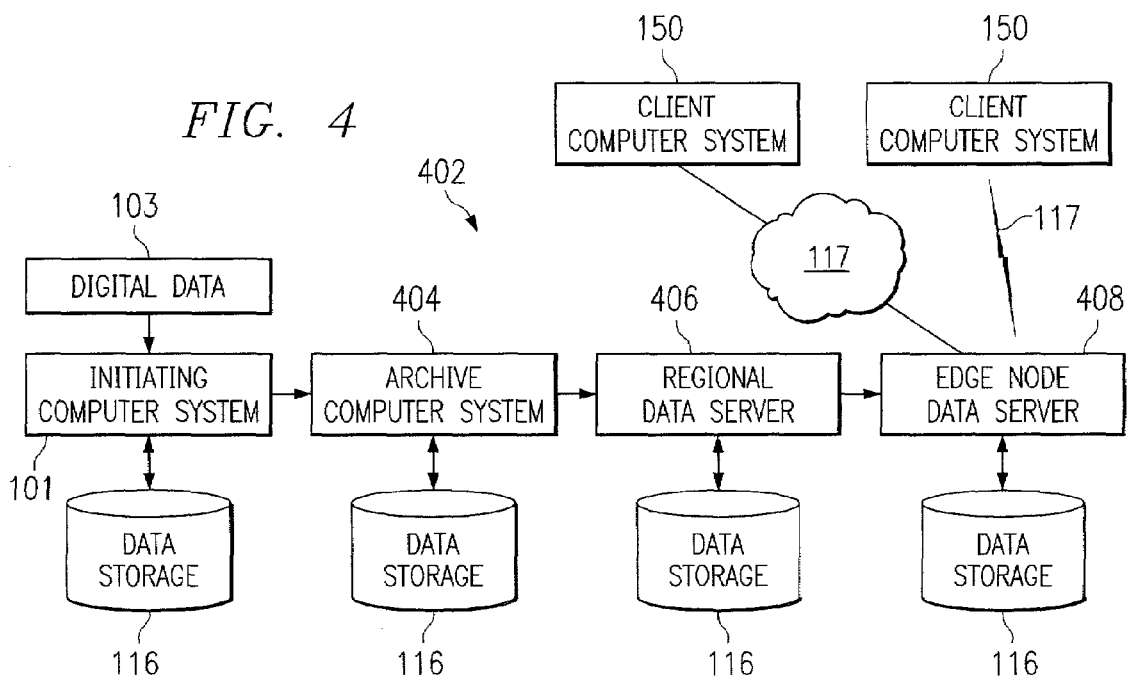

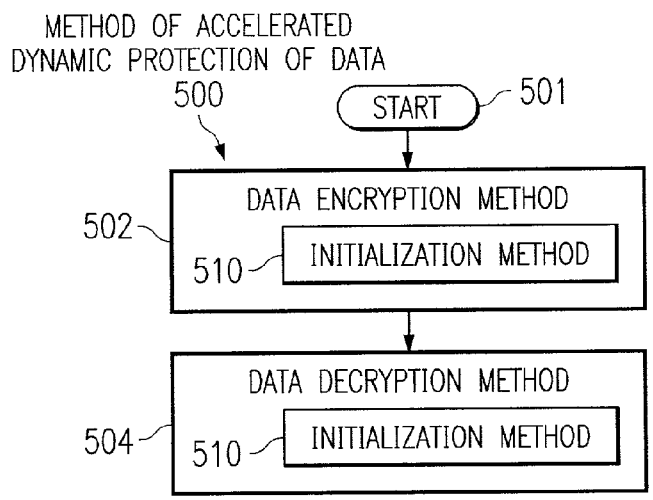
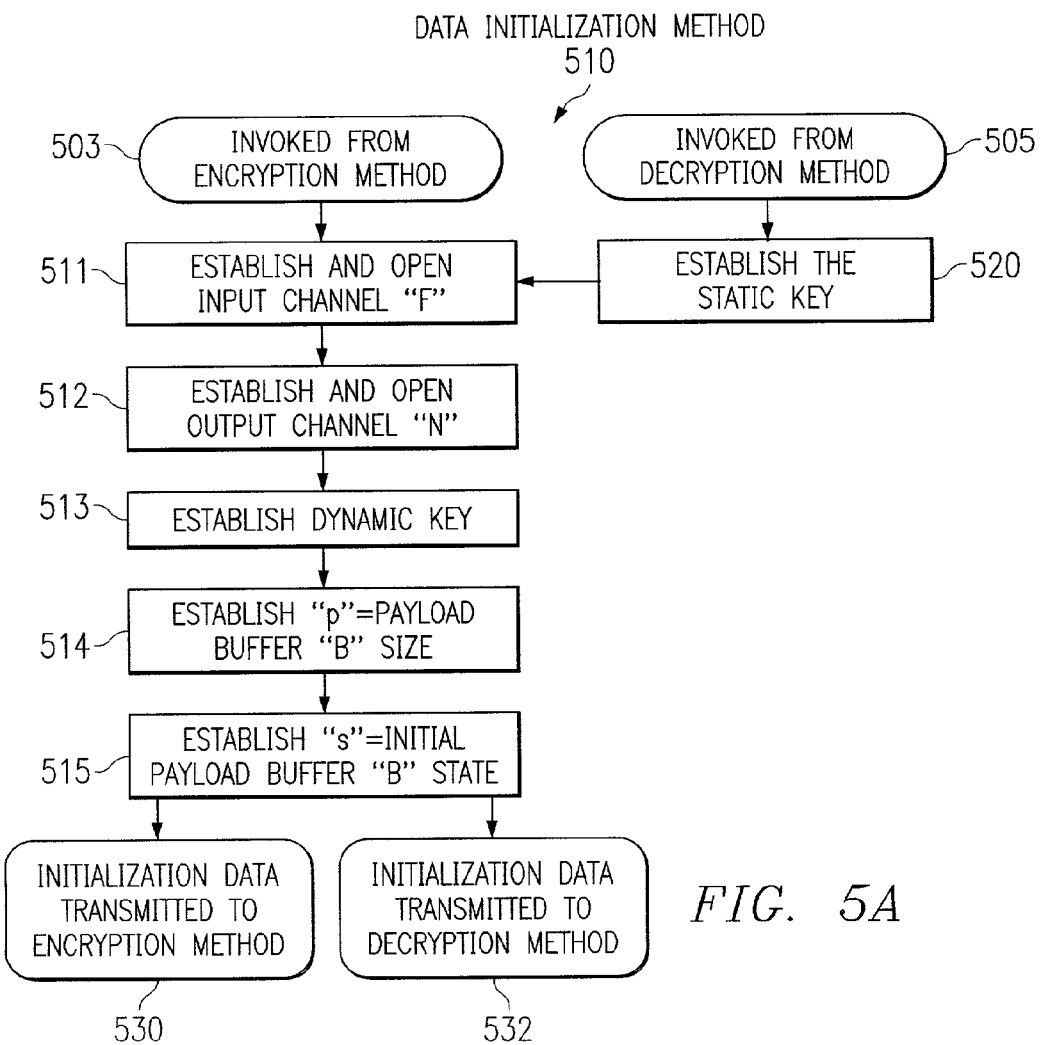

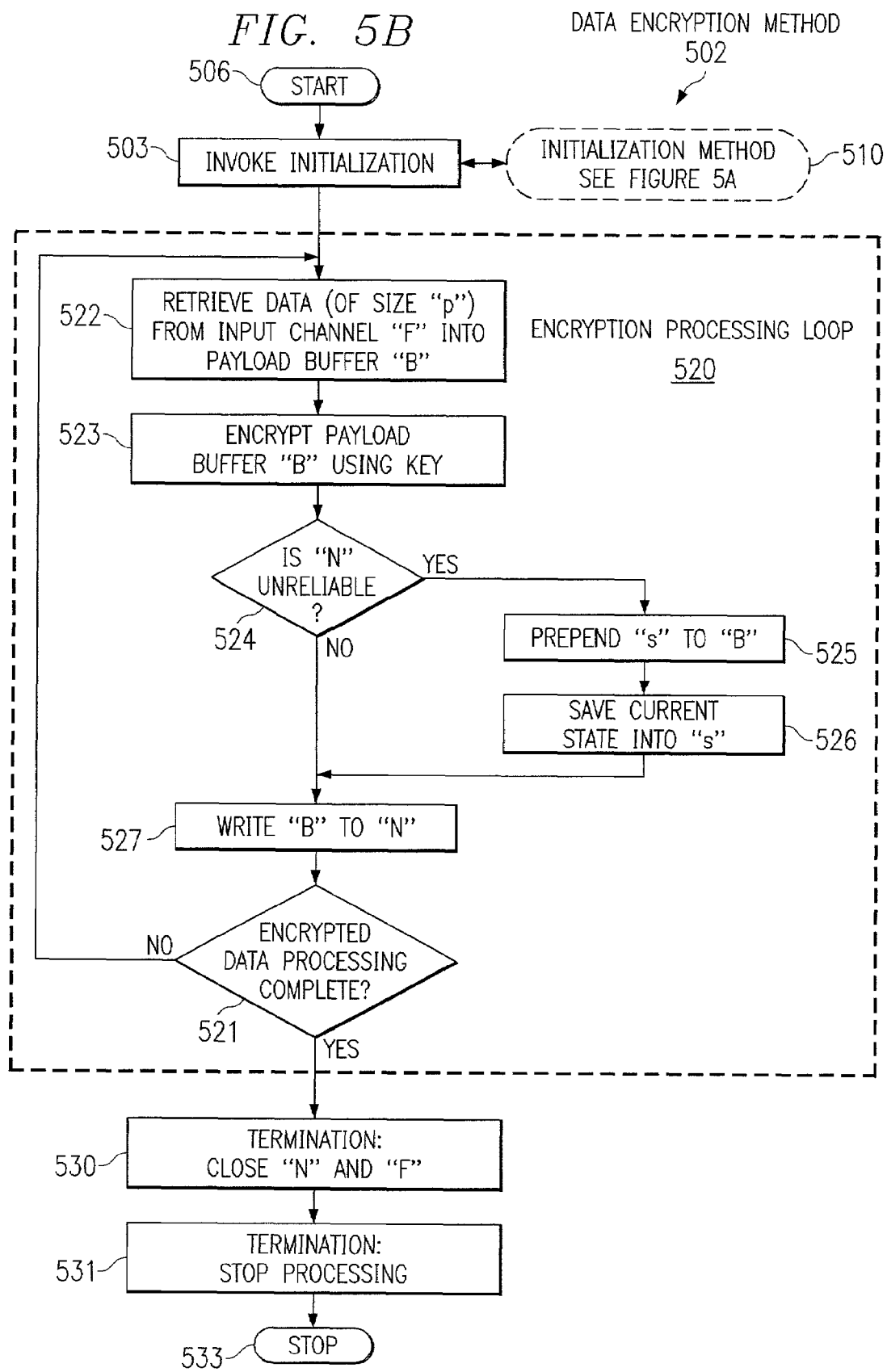

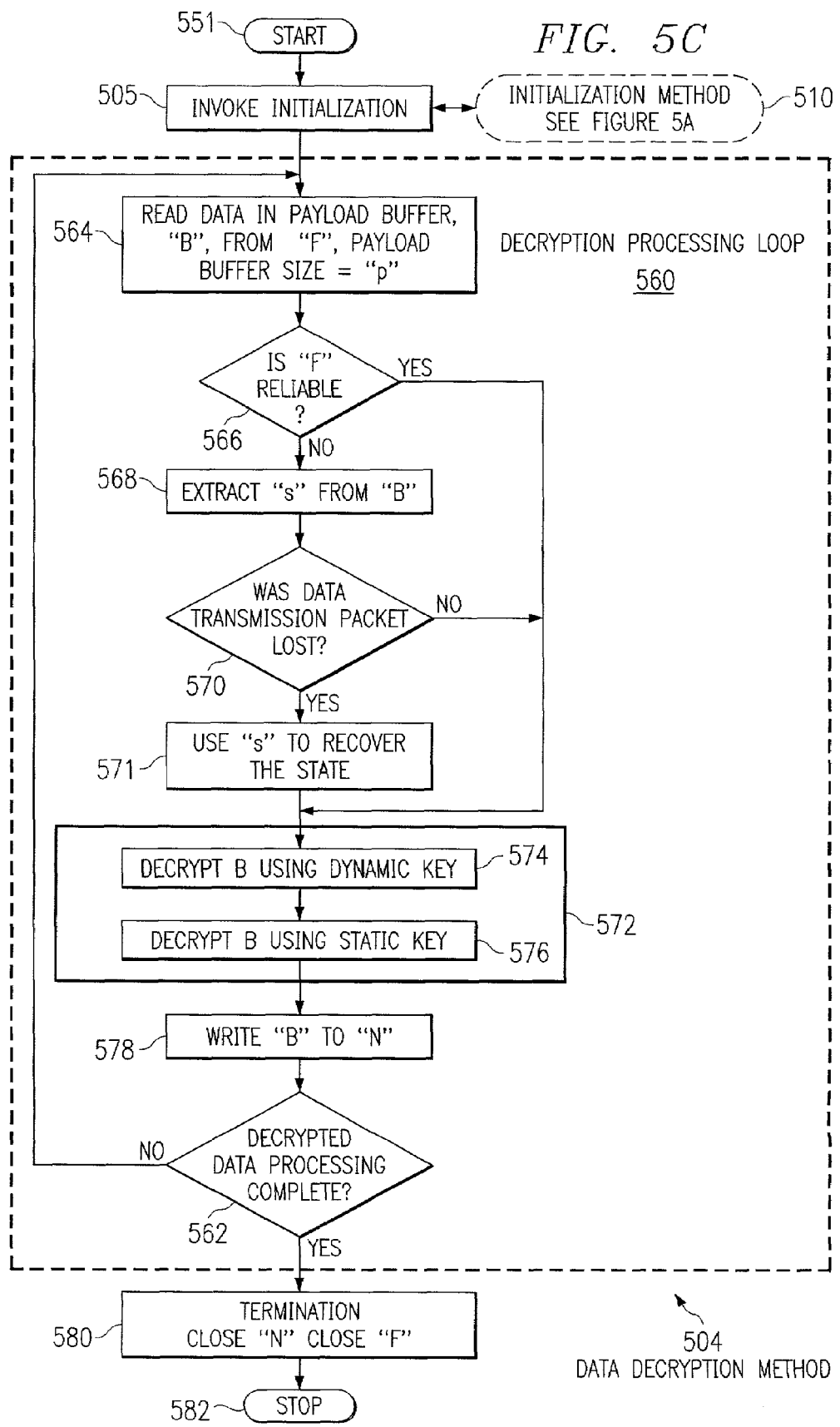

SYSTEMS, METHODS, AND COMPUTER PROGRAM PRODUCTS FOR ACCELERATED DYNAMIC PROTECTION OF DATA

BACKGROUND OF THE INVENTION

1. Field of the Invention

The present invention relates generally to encryption systems, and more particularly to data encryption systems, methods, and computer program products for accelerated encryption and decryption of a data element using both static encryption and dynamic encryption.

2. Description of the Background Art

Data, such as audio and video data, is typically transmitted from an initiating computer system to a data server computer system and is then transmitted to a client computer system. In order to protect the data from theft or improper access, the data may be transmitted in an encrypted form and may be stored on a computer system in an encrypted form. It is desirable to protect data with strong encryption. Static encryption may be implemented as strong encryption.

It will be appreciated by those skilled in the art that data encrypted with a static key that retains the same value during the transmission and storage of the data is statically encrypted data. For example, when data is encrypted at the initiating computer system, transmitted to the server system, and then transmitted to the client computer system before decryption, the data may be referred to as statically encrypted data. Such static encryption provides end-to-end security between the initiating computer system and the client computer system. Static encryption is limited since it requires significant computer resources to process and it is therefore difficult to rapidly change the static encryption key if necessary, especially for large data collections.

It will be appreciated by those skilled in the art that dynamic encryption transformations are performed with a key whose value is typically assigned on a per-use basis and may be rapidly changed during transmission or storage operations associated with the data. In the past, the initiating computer system encrypted the data before transmitting the data on to the data server. Then the data server decrypted the data and dynamically assigned a protected key. The data server then encrypted the data with the new dynamic key prior to further transmission of the data thereby enabling encryption on a per-use basis. For example, when a client computer system requests data the data server may encrypt the data, using a client-specific encryption key, and then transmit the data to the client computer system. Dynamic encryption is typically used to transmit data over the Internet by techniques such as the Secure Sockets Layer (SSL). Dynamic encryption is limited as it consumes significant computer resources since the dynamic encryption is performed each time the dynamic key is changed. Further, dynamic encryption is typically implemented as weak encryption and may not provide strong protection of the data.

Transmission of digital data, such as audio or video data, from the initiating computer system that is managed by a content provider to the data server, and then to the client computer system typically includes static encryption generated by the initiating computer system. If the content provider has a high degree of trust in the security of the data server the data may be decrypted and stored at the data server, and re-encrypted only when transmission to the client computer system is imminent.

Decryption of the interim data is inefficient. Since the content provider seeks to maintain control of the static key, decryption by the server system is limited to trusted intermediary data servers that the content provider has allowed to have access to the content provider's static key and to the decrypted data. Decryption eliminates end-to-end security since the data has been decrypted on an intermediate data server computer system prior to transmission to the client computer system. It will be appreciated by those skilled in the art that decryption and re-encryption may also occur on a trusted client computer system.

Typically, the data server is responsible for protecting and transmitting a large amount of digital data and therefore efficient encryption is required. The constraints of efficient encryption and the inefficiency of interim decryption often limit dynamic encryption to weak encryption, which typically does not provide sufficient protection for the data. Static encryption does not support rapid change of the encryption key, especially for large data collections, and therefore limits the protection of digital data.

SUMMARY OF THE INVENTION

It is therefore an object of the present invention to provide accelerated data encryption systems, methods, and computer program products that sufficiently protect a data element.

It is another object of the invention to encrypt and to decrypt the data element using both a static key and a dynamic key.

It is another object of the invention to transmit secure data without decrypting statically encrypted data prior to dynamic encryption of the data.

It is another object of the invention to rapidly change the dynamic encryption key used by the data server computer system if protection of the data may be compromised.

It is another object of the invention to enable stronger dynamic encryption than in the past.

It is another object of the invention to maintain end-to-end protection of the data.

It is another object of the invention to eliminate the need for trusted computer systems, such as trusted data servers, to transmit the secure data.

This and other objects are provided according to the present invention by encryption systems, methods, and computer program products that encrypt and decrypt a data element using both a static key and a dynamic key.

In particular, according to the present invention, data is encrypted with a static key, typically on an initiating computer system as may be used by a content provider, such as a publisher. Then data is further encrypted with a dynamic key. The static key and the dynamic key are both used to decrypt the data, typically on a client computer system. The present invention novelly maintains information about the state of the data, so that if a portion of the data is lost or corrupted, decryption can continue without retransmission of the data. Therefore, the present invention eliminates the need for decryption prior to dynamic encryption since the state of the data is known throughout the encryption and decryption process. In the preferred embodiment of the present invention the dynamic encryption is performed by the data server computer system. In an alternate embodiment, both static encryption and dynamic encryption operations occur on the initiating computer system.

Content publishing, such as the delivery of audio or video digital data, often requires protection of the data while stored on computer systems, while transmitted over networks, and while stored on end-user computer systems, such as client computer systems. Therefore, encryption of data often occurs during content publishing. Typically the content publisher hosts data on an initiating computer system and transfers the data to a data server computer system. The data is then transferred to the client computer system, typically upon request from the client computer system via Internet access. Encryption at the content publisher site is typically static encryption and uses a static key. Static encryption does not reflect dynamic encryption transformations that require a dynamic key that is often specific to the client computer system or even to a user having access to the client computer system. Therefore, it is difficult to rapidly change the encryption key if necessary, especially for large data collections. Those skilled in the art will appreciate that static encryption may be performed by using multiple static keys.

The data server may require additional protection for the data prior to data transmission to client computer systems. Also, introduction of data server identification information such as watermarks may be required prior to transmitting the data to the client computer system. Therefore, in the past the data was typically decrypted and subsequently dynamically encrypted prior to transmission to the client computer system. The present invention novelly eliminates decryption of the data on the data server and subsequent re-encryption of the data using a dynamic key that is often a user-specific key. Thereby the present invention improves the efficiency of encryption of the data by eliminating decryption of the statically encrypted data while incorporating the advantages of a dynamic key such as enabling rapid change of the dynamic key.

A dynamic encryption key may be established by a computer system and then communicated to both the data server and to the client computer system. For example, upon a request for data from a specific client computer system a unique encryption key may be transmitted, typically from the data server, and used during the specific transmission of encrypted data. Alternately the dynamic encryption key may be an asymmetric key configuration having a public key that is distributed widely and a private key that is protected. The public key is used for encryption and the private key is used for decryption.

It will be appreciated by those skilled in the art that the static key is typically used to encrypt the data element using strong encryption. The phrase "strong encryption" will be used herein to refer to encryption operations that ensure robust protection of the data but require extensive computer resources and are unsuited to applications that require rapid response. Block encryption is an example of strong encryption.

The dynamic key is typically shared between the data server and the client computer system or between the initiating computer system and the client computer system. Dynamic encryption operations may be labeled "weak encryption." The present invention novelly enables stronger dynamic encryption than in the past. More particularly, since the dynamic encryption is performed on the data that has been transformed by static encryption and according to the present invention intermediate decryption is eliminated; computer system resources used in the past for intermediate decryption may be applied to strengthening dynamic encryption operations.

Typically, content publishers maintain control of encrypted data throughout transmission of the data by only distributing key information to trusted systems. Operating a trusted system is difficult in that access to the system and to information on the system must be monitored to ensure the security of the data is not compromised. In the present embodiment if the data server performs dynamic encryption, decryption of the statically encrypted data is not required. Therefore, the data server may be untrusted since the data remains protected by encryption while being manipulated by the data server.

In one embodiment of the present invention decryption is performed on the client computer system. Decrypting the data associated with dynamic encryption may require either software or hardware transformations, depending on the amount of computer resources required.

Other aspects and advantages of the present invention will become apparent from the following detailed description, taken in conjunction with the accompanying drawings, illustrating by way of example the principles of the invention.

BRIEF DESCRIPTION OF THE DRAWINGS

Referring now to the drawings in which like reference numbers represent corresponding parts throughout:

FIG. 1 is a block diagram that illustrates the preferred embodiment of the present invention;

FIG. 4 is a block diagram that illustrates an example of the data transmission;

FIG. 5 is a flow diagram that illustrates the method of accelerated dynamic protection of data;

FIG. 5A is a flow diagram that illustrates the method of initialization;

FIG. 5B is a flow diagram that illustrates the method of encrypting the data;

FIG. 5C is a flow diagram that illustrates the method of decrypting the data.

DETAILED DESCRIPTION OF THE INVENTION

Figure 2:
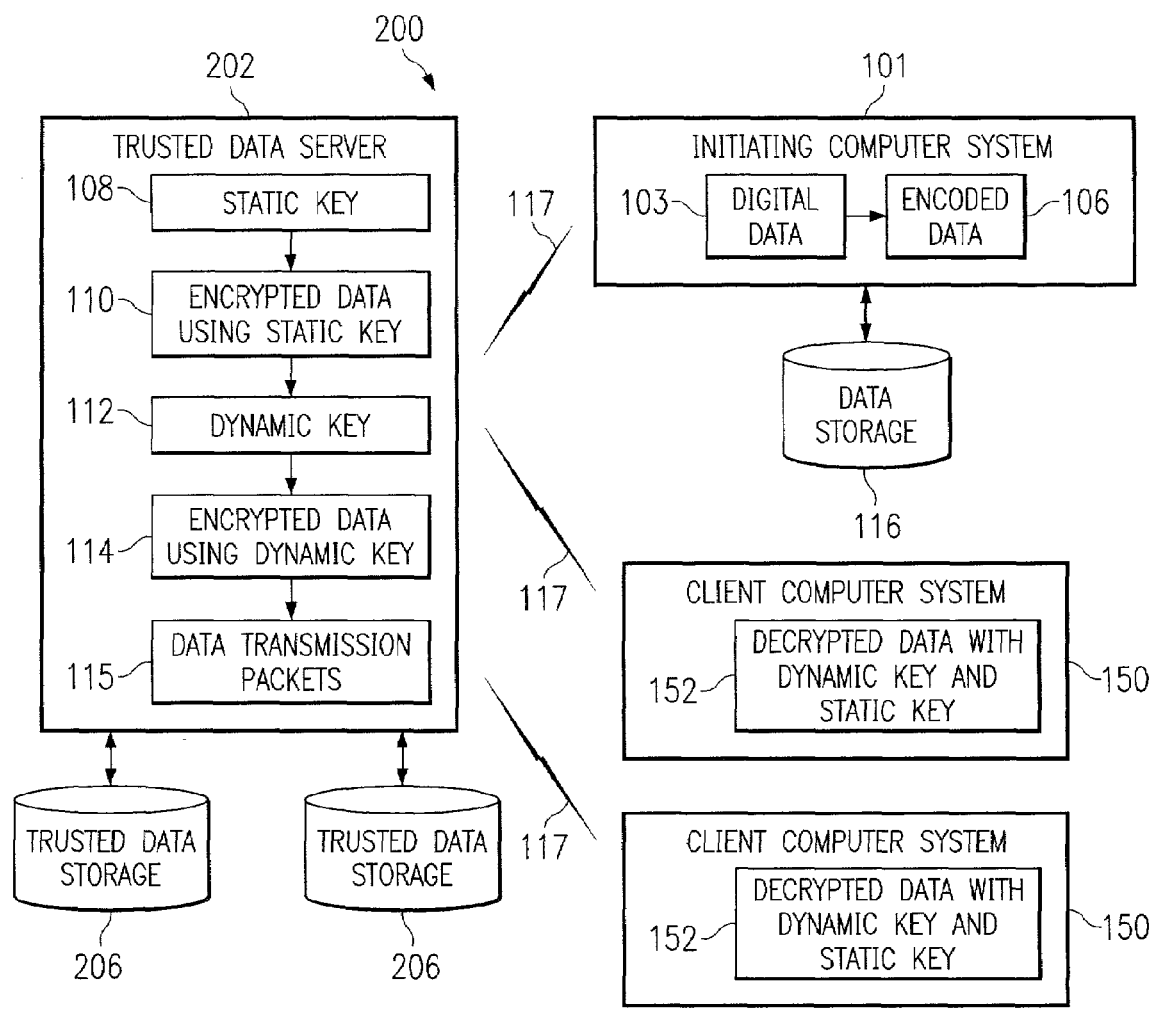
FIG. 2 is a block diagram that illustrates an alternate embodiment of the present invention.

As shown in the drawings and for purposes of illustration, the present invention is embodied in a novel system, method, and computer product that accelerates encryption and decryption of a data element using both a static key and a dynamic key. It is to be understood that other embodiments may be utilized and structural and functional changes may be made without departing from the scope of the present invention. Existing encryption and decryption systems have not been able to provide sufficient protection for data during transmission between computer systems while performing in a sufficiently efficient manner. Features such as maintaining end-to-end security and enabling rapid alteration of the encryption key have not successfully operated together in the past.

Typically a static key is used to encrypt data so that the data may be securely transmitted between computer systems. Often a dynamic key is subsequently used to encrypt the data during intermediate data transmission operations typically performed by a data server. In the past many encryption implementations have existed that used various combinations of static and dynamic keys. Other past implementations used only static keys, only dynamic keys, and completely private keys. It will be appreciated that the encryption implementations described herein are used to fully describe the present invention and do not limit the type of encryption implementations that may be used to practice the present invention.

The present invention novelly eliminates decryption of the data prior to encryption with the dynamic key. Therefore the present invention operates more efficiently than encryption operations in the past and can apply the saved computer resources to enabling stronger dynamic encryption than in the past. Further, since the data is not compromised by decryption during intermediate data transmission operations the need for trusted data servers to transmit the data is also eliminated. In the present invention the static key and the dynamic key are both used to decrypt the data, typically on a client computer system.

FIG. 1 illustrates the preferred embodiment of the present invention that includes an encryption-decryption system 100 that also enables efficient static and dynamic encryption of the data 103 without decryption during intermediate transmission of the data 103. The encryption-decryption system 100 distributes encryption operations between the data server 102 and the initiating computer system 101 and thereby minimizes resources required for computer operations by each computer system. Since static encryption requires significant computer resources the present embodiment associates static encryption with a different computer system than the dynamic encryption and therefore facilitates cost-effective distributed use of computer resources.

The initiating computer system 101 creates compressed and encoded data 106 that may be stored in computer-readable form on the data storage device 116. Compressing eliminates redundancies in data information and encoding improves the data format. By means of example, data 103 may be compressed and encoded in a format suitable for transmission such as MPEG. It will be appreciated by those skilled in the art that the Moving Picture Experts Group (MPEG) is a working group of the International Organization for Standardization (ISO) and the International Electrotechnical Commission (IEC) in charge of the development of standards for encoded representation of digital data 103 representing audio and video information. The purpose of compressing or encoding the digital data 103 is to reduce the size of the data 103 that is stored or transmitted. Most compression and encoding operations are based on attributes associated with data information such as color, motion, and shape.

The terms "data" and "digital data" will be used interchangeably herein and refer to information that can be manipulated and stored on a computer system. Also the present invention may operate on a single data element or on a data collection. The terms, "data server" and "data server computer system" will be used interchangeably herein. Further, the terms "key" and "encryption key" will be used interchangeably herein.

The initiating computer system 101 also uses the static key 108 to create statically encrypted data, typically by strong encryption, as shown in element 110. The encrypted data 110 may also be stored on the data storage device 116.

The statically encrypted data 110 is transmitted to the data server 102 by any data transmission device 117. The data server 102 then uses the dynamic key 112 to create dynamically encrypted data, as shown in element 114. In the past, computer resources available to the data server 102 for encryption and decryption were primarily used to decrypt the data encrypted with the static key 108 prior to transmission of the dynamically encrypted data 114 to the client computer system 150. The present invention novelly eliminates the need for decryption during processing by the data server 102 and therefore saves computer resources that may now be used to enable a more robust, dynamic key 112 protection on a computer system-specific basis.

Typically the static key 108 is a global key since the data encrypted with the static key 108 is available to many computer systems while the dynamic key 112 is unique to a computer system such as the client computer system 150. It will be appreciated by those skilled in the art that a computer system key protects information, typically by operating as an initial value that is used during encrypting and decrypting transformations. For example, given a secret initial value via a key the data 103 may be protected by transformations that change plaintext into ciphertext. A cipher is a key-selected transformation typically between plaintext and ciphertext. Plaintext refers to the original message as it exists prior to encrypting transformations. Ciphertext refers to the transformed information as it exists after the encrypting transformations. The transformation operates on individual characters or bits of data 103 that are independent of semantic content. Ciphertext may be stored or transmitted without exposing information about the transformation operation and without compromising the protection of the secret information.

Also by means of example, a block cipher transforms blocks of data 103 as opposed to transforming a bit stream of data 103. A stream cipher employs a less intensive transformation of a bit stream of data 103 and thereby uses less computer system resources than a block cipher. The term "bit stream" is used herein to identify a sequence of bits that are not limited to a fixed-size, such as a fixed-size block of bits. The present invention may operate on block cipher transformations for static encryption and stream cipher transformations for dynamic encryption transformations. It will be appreciated by those skilled in the art that dynamic encryption transformations may be performed with a string of encryption keys and are not limited to the use of one encryption key. Further, according to the present invention static encryption is not limited to block cipher transformations and dynamic encryption is not limited to stream cipher transformations. Therefore, the present invention ensures strong protection of the data from the initiating computer system transformation to decryption by the client computer system. Further, the preferred embodiment enables rapid change of the statically encrypted data 110 by the dynamic key 112 via dynamic encryption transformations.

The data 103 used and created on the data server 102 may be stored in computer-readable media data storage 116. The dynamically encrypted data 114 is typically not stored on permanent storage, such as computer disks. For example, the dynamically encrypted data 114 may be stored in computer memory. Further, the dynamically encrypted data 114 may be partitioned into chunks and each chunk may be processed with the use of computer memory thereby eliminating storage during the operation of the present invention. The data transmission packets 115 are also usually not stored on permanent computer storage but are built as part of a transmission request. It will be appreciated by those skilled in the art that data storage 116 may be computer memory, computer disks, or another storage medium suitable for storing digital data 103.

The data server 102 transmits data transmission packets 115 to client computer systems 150 by the data transmission device 117. A data transmission device 117 may include a local area network (LAN), a wide area network (WAN), the Internet, a satellite system, or any other device known now or that may be available in the future that transmits digital data 103. It will be appreciated that the number of client computer systems 150, data servers 102, or initiating computer systems 101 may be large and is not limited to the example shown in FIG. 1. In order to facilitate tracing the data transmission packets 115, the dynamic key 112 may contain identification information associated with the data server 102, such as a digital signature or a watermark. Those skilled in the art will understand the use of a digital signature in conjunction with encryption. The client computer systems 150 may then decrypt the data by using both the dynamic key 112 and the static key 108, as shown in element 152.

In the present embodiment examples of the computer system include the initiating computer system 101, the data server computer system 102, and the client computer system 150. A computer system typically includes components such as a processor, a memory, data storage devices 116, an I/O adapter, a communications adapter, data transmission devices 117, a user interface adapter, a keyboard, a mouse, a display adapter, and a computer monitor. The computer system may be connected locally or remotely to fixed or removable data storage devices 116 and data transmission devices 117. The initiating computer system 101, the data server 102, and the client computer system 150 also could be connected to other computer systems via the data transmission devices 117. Those skilled in the art will recognize that any combination of the above components, or any number of different components, peripherals, and other devices, may be used with the initiating computer system 101, the data server 102, and the client computer system 150. Those skilled in the art will also recognize that the present invention may be implemented on a single computer system rather than multiple computer systems that are networked together.

The present invention is typically implemented using one or more computer programs, each of which executes under the control of an operating system and causes the initiating computer system 101, the data server 102, and the client computer system 150 to perform the desired functions as described herein. Thus, using the present specification, the invention may be implemented as a machine, process, method, system, or article of manufacture by using standard programming and engineering techniques to produce software, firmware, hardware or any combination thereof.

Generally, the computer programs and operating systems are all tangibly embodied in a computer-readable device or media, such as memory, data storage 116, or data transmission devices 117, thereby making an article of manufacture, such as a computer program product, according to the invention. As such, the terms "computer program product" as used herein are intended to encompass a computer program accessible from any computer readable device or media.

Moreover, the computer programs and operating systems are comprised of instructions which, when read and executed by the initiating computer system 101, the data server 102, and the client computer system 150, cause the initiating computer system 101, the data server 102, and the client computer system 150 to perform the steps necessary to implement and use the present invention. Under control of the operating system, the computer programs may be loaded from the memory, data storage 116, or data transmission devices 117 into the memories of the initiating computer system 101, the data server 102, and the client computer system 150 for use during actual operations. Those skilled in the art will recognize many modifications may be made to this configuration without departing from the scope of the present invention.

It will be understood by those skilled in the relevant art that there are many possible configurations of the components of the computer system and that some components that may typically be included in the computer system are not shown. Indeed, those skilled in the art will recognize that other alternative computer systems may be used without departing from the scope of the present invention.

As shown in FIG. 2 an alternate embodiment of the present invention includes an alternate encryption-decryption system 200 that also enables efficient static and dynamic encryption of the data 103. The alternate encryption-decryption system 200 also eliminates decryption during intermediate transmission of the data 103. The initiating computer system 101 transforms digital data 103 to encoded data 106 that may be stored in computer-readable form on the data storage device 116. The transformations are performed on the data server 102 (as shown in FIG. 1) and therefore this embodiment requires a trusted data server 202 to ensure the security of the static key 108 and the data 103. The phrase "trusted system" will be used herein to refer to a computer system that is entrusted with protected data 103 or metadata, such as an encryption key. The trusted system typically has a decryption key associated with the data 103 that was encrypted by another computer system. While the alternate encryption-decryption system 200 requires a trusted data server 202, there are still benefits of improved encryption and decryption efficiency.

The data 103 is transmitted to the trusted data server 202 via the data transmission device 117. The trusted data server 202 uses the static key 108 to create encrypted data typically by strong encryption, as shown in element 110. This operation typically requires more computer resources than a weak encryption operation. The dynamic key 112 is used to create encrypted data, as shown in element 114. Static encryption operates typically with a globally available key. The dynamically encrypted data 114 may be weakly encrypted. By means of example, strongly encrypted data 103 may be distinguished from weakly encrypted data 103 merely by the size of the encryption key, the number of rounds performed by the block encryption cipher, or by the cipher itself. More particularly, a stream cipher is considered weaker than a block cipher because stream ciphers are not standardized and therefore have not received the same scrutiny as block ciphers. Another distinguishing factor in the robustness of encryption is the length of the key. A strong encryption key typically includes approximately one hundred twenty-eight bits while a weak encryption key typically only includes up to forty bits. A "bit" is typically the smallest unit of information in a computer system. The computer resources required to transform the data 103 by use of a large encryption key may be extensive and therefore operate slower than transformations that use a small encryption key.

The data 103, the static key 108, and the dynamic key 112 may be stored on computer-readable media trusted data storage 206. It will be appreciated that the trusted data storage device 206 is necessary when the static key 108 is used by the trusted data server 202. Further, the trusted data storage devices 206 may include computer memory. The data transmission packets 115 may be delivered to the client computer system 150 via any data transmission device 117, such as a computer network. The client computer system 150 decrypts the data 103 using the static key 108 and the dynamic key 112, as shown in element 152.

Figure 3:
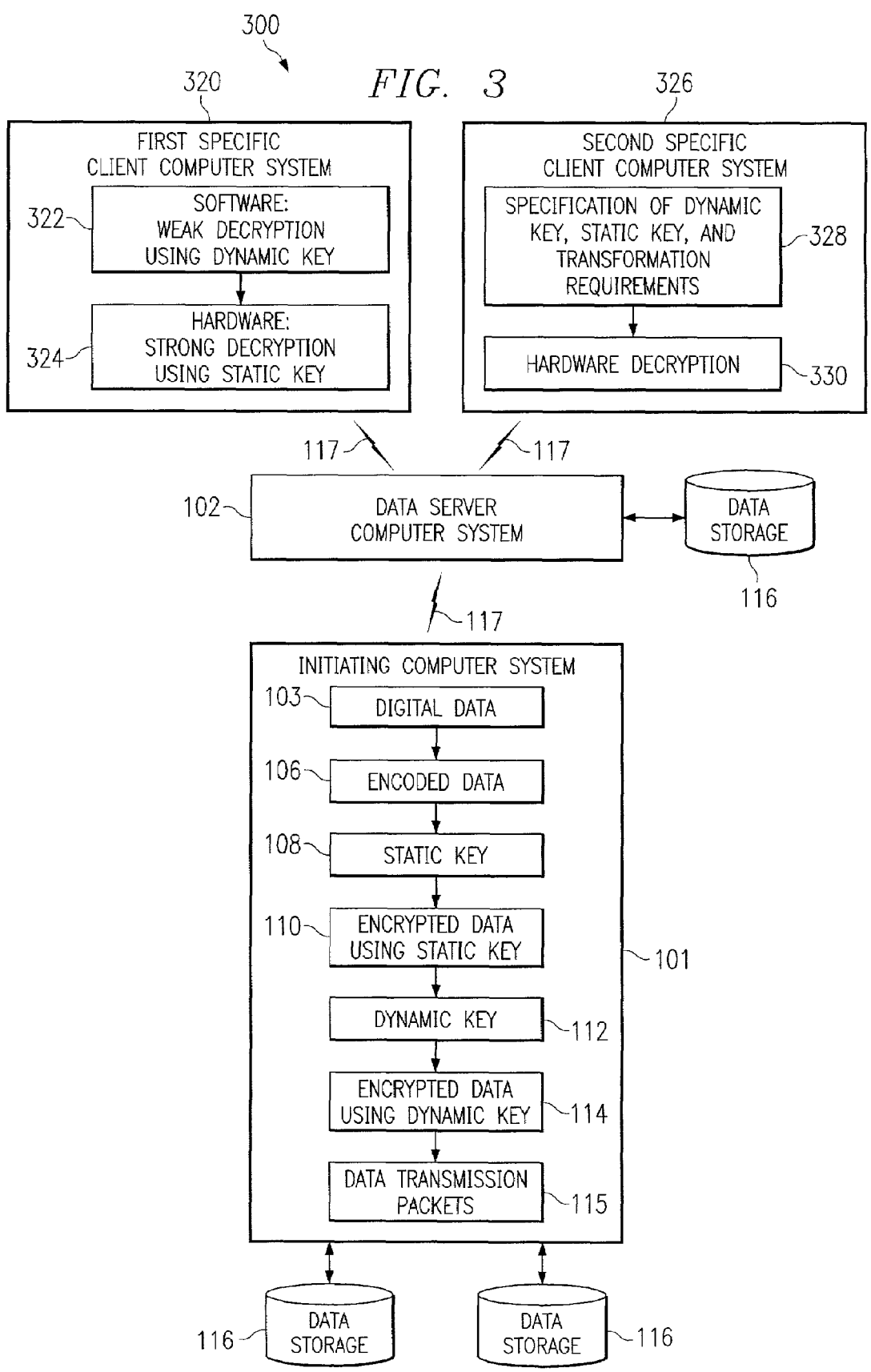
FIG. 3 is a block diagram that illustrates yet another embodiment of the present invention.

FIG. 3 illustrates yet another alternate embodiment of the present invention and includes a second alternate encryption-decryption system 300 that enables efficient static and dynamic encryption of the data 103 without decryption during intermediate transmission of the data 103. In the second alternate encryption-decryption system 300 the initiating computer system 101 creates compressed and encoded data 106.

After the data 103 is encoded, a static key 108 is used to create encrypted data 110 typically by strong encryption. A dynamic key 112 is used to create dynamically encrypted data 114. In order to transmit the encrypted data 114, data transmission packets 115 are created. It will be appreciated by those skilled in the art that the data transmission packets 115 may be formatted for use by a computer network system or by another data transmission device 117 used to transmit digital data 103. The data 103 may be stored in a computer-readable format in data storage 116.

The data transmission packets 115 are then transmitted over a data transmission device 117, such as a computer network system, to a data server computer system 102. The data 103 may be stored in a data storage system 116 prior to further transmission. A trusted data storage system 206 (as shown in FIG. 2) may be required to protect the dynamic key 112.

Typically the data server 102 will service a large number of client computer systems, as illustrated in elements 320 and 326. It will be appreciated that elements 320 and 326 illustrate specific examples of the client computer system 150 (as shown in FIG. 1). For example, the first specific client computer system 320 decrypts the dynamic key 112 with weak decryption via operations performed in software, as shown in element 322. Decryption of the static key 108 is performed via hardware components of the computer system, as shown in element 324.

It will be understood by those skilled in the art that decryption may be performed via software or hardware. By means of example, the first specific client computer system 320 obtains data 103 that has been encrypted statically using a block cipher and dynamically using a stream cipher. Stream ciphers are generally implemented in software, whereas block ciphers may be implemented in hardware or software. The dynamic key 112 is passed to the stream cipher and the static key 108 is passed to the block cipher. The stream cipher uses the dynamic key 112 to decrypt the dynamically encrypted data 114, as shown in element 322. Then the operations progress, as shown in element 324, in which the block cipher uses the static key 108 to further decrypt the statically encrypted data 110.

Element 326 illustrates an alternative example, a second specific client computer system. A specification of the dynamic key 112, the static key 108, and the information about the transformation requirements, such as the number of rounds used during encryption, is obtained as shown in element 328. Then the decryption of both the static key 108 and the dynamic key 112 is performed via hardware operations of the second specific client computer system 326 as shown in element 330. For example, the static encryption is performed by a block cipher, which operates by iterative operations called "rounds." A round is typically a series of operations that are repeated and produce encrypted or decrypted data 103. In general, increasing the number of rounds increases the robustness of the encryption. The dynamic encryption may also be performed by a series of block cipher rounds. A smaller number of rounds may be performed for dynamic encryption than would be performed for static encryption to accelerate the dynamic encryption operation.

By means of example, FIG. 4 illustrates a content publisher system 402 that practices the present invention. The digital data 103 created by a content publisher that typically includes video or audio information may be encoded and encrypted by the initiating computer system 101. The encryption may be performed with a static key 108 and a dynamic key 112 (as are shown in FIG. 1). The data 103 is therefore protected so that it may be transmitted without fear of theft. The initiating computer system 101 may transmit the data 103 in its encoded and encrypted state to an archive computer system 404 that may be used for intermediate storage or for search and retrieval purposes. The data 103 then may be transmitted to a regional data server 406 that may represent a business unit for purposes of distribution or management of the protected data 103. The data 103 may then be transmitted to an edge node data server 408 that is located so that communication with various client computer systems 150 is efficient. The edge node data server 408 may add encryption to the data 103 typically by use of a dynamic key 112. The client computer system 150 may decrypt the protected data 103 typically with a user-specific encryption key.

It will be appreciated that the data 103 may be stored on a computer-readable storage device 116, including computer memory, at any stage of the content publisher system 400. However, the dynamic key 112 used by the edge node data server 408 typically is protected and therefore not located on permanent storage, such as a disk storage device. The initiating computer system 101, the archive computer system 404, and the regional data server 406 may include multiple computer systems. Also, the data transmission device 117 may be any form of network such as the Internet or a satellite communication system.

FIG. 5 illustrates the method of accelerated dynamic protection of data and, as shown in element 500, embodies the present invention. As shown in element 501, the process is started. Then, as shown in element 510 the data 103 (as shown in FIG. 1) is initialized upon invocation from element 502 or from element 504 and is described in detail with reference to FIG. 5A. As shown in element 502 the data 103 is encrypted and is described in detail with reference to FIG. 5B. As shown in element 504 the data 103 is decrypted and is described in detail with reference to FIG. 5C.

Figure 6:
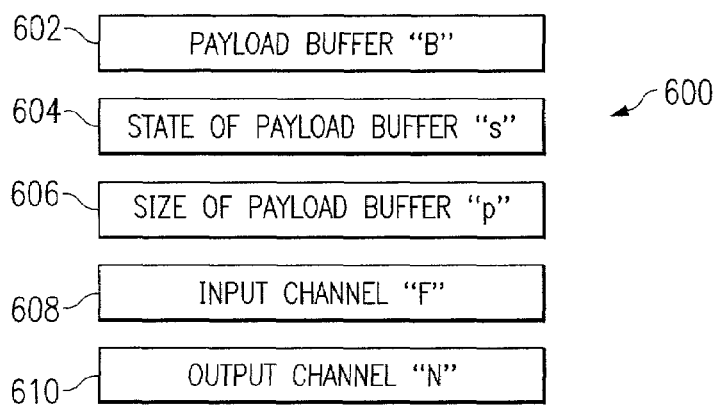
FIG. 6 is a block diagram that illustrates the elements associated with the method of initialization.

FIG. 5A illustrates the method of initialization and FIG. 6 is a block diagram that describes the elements used with reference to the method of initialization. Now referring to FIG. 5A, element 510 illustrates the detailed operation of initialization in the present invention. Initialization can be invoked by either element 503 or element 505 and enables communication links and establishes elements typically by configuring the initial value for the element. When element 505 invokes the data initialization method 510 in order to decrypt the data 103, the static key 108 is established, as shown in element 520. The static key 108 is typically established prior to invocation from the encryption method, as shown in element 503. As part of the method of initialization 510, an input channel, "F," 608 is established and opened, as shown in element 511 so that the data 103 that is encrypted or decrypted may be received for subsequent processing. The input channel, "F," 608 may be established subsequent to the operation of element 503 or element 520. An output channel "N" 610 is established and opened, as shown in element 512 so that the data 103 that is encrypted or decrypted may be transmitted, stored, or accessed. Elements 608 and 610 are described with reference to FIG. 6 and elements 103 and 108 are described with reference to FIG. 1.

The data 103 that is established to enable transmission via the input channel, "F," 608 and the output channel, "N," 610 includes: the dynamic key 112 as shown in element 513, the static key as shown in element 520, the payload buffer size, "p" 606, as shown in element 514, and the initial value for the state of the payload buffer, "s," 604 as shown in element 515. The dynamic key 112 may be established via any existing mechanism for securely distributing keys such as one used in the product sold under the trademark Tivoli® SecureWay®. Elements 606 and 604 are described with reference to FIG. 6.

An example of the use of the state, "s," 604 is ciphers that implement state maintenance that is useful for encryption and decryption with keys. More particularly, initialization of the value of the state, "s," 604 is required for ciphers that implement state maintenance. Consider plaintext, which contains multiple instances of a given value. If a cipher were to consistently transform a given plaintext value into the same ciphertext value, the encryption would be susceptible to context-based attacks. To address this problem, a cipher may maintain a state, "s," 604. This state, "s," 604 is input to each set of cipher operations and ensures the ciphertext for a given plaintext value is not always the same value.

The implications of using a state, "s," 604 in the present invention follow.

First, the state, "s," 604 is initialized with a value. The initial state, "s," 604 may be either mutually determined by the data server 102 and the client computer system 150 (as shown in FIG. 1), or may be transmitted to the client computer system 150 from the data server 102.

Second, payload buffers, "B," 602 are presented during the data decryption method 504 in the same order as they were presented during the data encryption method 502. The data decryption method 504 is described in detail with respect to FIG. 5B and the data encryption method 502 is described in detail with respect to FIG. 5B.

Third, if an unreliable channel is used, the data decryption method 504 requires a way to recover the state, "s," 604 in order to decrypt the data 103 that follows the transmission loss. That is, the data decryption method 504 includes state recoverability information in the form of the state, "s," 604. The method of saving the state, "s," 604 is described with reference to elements 525 and 527 in FIG. 5B. The method of extracting the state, "s," 604 is described with reference to element 568 in FIG. 5C.

Fourth, if the static encryption requires maintenance of the state, "s," 604 to enable decryption, either the transmission channel between the encrypting computer system and the decrypting computer system should be reliable or the method of data decryption 504 should enable recovery of the state, "s," 604. To enable recoverability, the payload buffer size, "p," 606 is typically the size of the data 103 presented in a buffer plus the size of the state, "s," 604 for encryption with a static key 108.

When initialization is complete the data is transmitted to either the encryption method as shown in element 534 or to the decryption method as shown in element 532.

FIG. 5B illustrates the method of encrypting the data 103. Specifically, element 502 illustrates the detailed operation of the present invention with respect to applying encryption with the dynamic key 112 to the data 103 that has been previously encrypted with the static key 108, as shown in element 114. Typically, this operation occurs on a data server 102. The operation starts as shown in element 506 and, as shown in element 503, invokes the initialization method 510. Elements 102, 103, 108, 112, and 114 are described with reference to FIG. 1.

Once initialization 510 is complete, the operation of the data encryption method 502 continues in the encryption processing loop 520 until the statically encrypted data 110 (as shown in FIG. 1) has been processed, as shown in element 521. While the statically encrypted data 110 has not been processed, the payload buffer, "B," 602 is filled with the statically encrypted data 110 retrieved via the input channel "F," 608 as shown in element 522. The size of the statically encrypted data 110 is typically equivalent to the payload buffer size "p" 606. Those skilled in the art will appreciate that the buffer transmitted last may be smaller than the typical payload buffer, "B," 602. The payload buffer "B," 602 is then encrypted using the dynamic key 112, as shown in element 523. Elements 602, 606, and 608 are described with reference to FIG. 6.

The present invention saves the state, "s," 604, in the encryption processing loop 520, thereby enabling recoverability of a lost payload buffer, "B," 602. Recoverability via use of a state enables decryption to continue without re-transmitting a buffer if it is lost. Therefore, the present invention transmits the saved state, "s," 604 to the client computer system 150 (as shown in FIG. 1). The purpose of including the saved state, "s," 604 in the same transmission as the encrypted payload buffer, "B," 602 is to ensure that decryption is successful even if an individual payload buffer, "B," 602 is lost. Those skilled in the art will appreciate that the saved state, "s," 604 is a value that represents the state at the time immediately preceding the encryption of the payload buffer "B," 602. It will be appreciated that the process of encrypting a buffer changes the state. When any data element 103 within the payload buffer "B," 602 is corrupt the entire payload buffer "B," 602 is considered corrupt. The output of encryption is the input for the decryption operation. If the output channel, "N," 610 is unreliable, as shown in element 524, the state, "s," 602 is prepended to the payload buffer "B," 602 as shown in element 525. The initial state, "s," 604 is saved during the operation of the initialization method 515 (as shown in FIG. 5A). As shown in element 526, the current state of the encrypted payload buffer, "B," 602 is saved into the state, "s," 604.

Alternately, in the case of existing stream and block ciphers, the state of the payload buffer "B" 602 may be encapsulated in the last portion of the encrypted payload buffer "B," 602. The location of the end of the payload buffer, "B," 602 may be determined by referencing the payload size "p," 606. Once this is complete, the payload buffer, "B," 602 may be transmitted to the output channel, "N," 610 as shown in element 527, either from element 526 or from element 524. More particularly, if the output channel, "N," 610 is unreliable processing proceeds to elements 525 and 526 before processing element 527.

This process repeats by returning to the test of element 521, until all of the statically encrypted data 110 has been encrypted with the dynamic key 112. Once the encryption is complete, the process terminates by closing the input channel, "F," 608 and output channel, "N," 610 as shown in element 530, terminating processing, as shown in element 531, and stopping 533.

FIG. 5C illustrates the method of decrypting the data 103 (as shown in FIG. 1). More particularly, element 504 illustrates the detailed operation of the present invention with respect to applying decryption with the static key 108 and the dynamic key 112 to the data 103 thereby generating decrypted data 152. Typically, this operation occurs on a client computer system 150. Elements 108, 112, 103, 150, and 152 are described with reference to FIG. 1. The operation starts as shown in element 551. As shown in element 505 the initialization method 510 (as shown in FIG. 5A) is invoked. Initialization is performed once for the data decryption method 502.

Once initialization is complete, the operation of the data decryption method 504 continues to the decryption processing loop 560. Therefore, while the data 103 has not been decrypted, as shown in element 562, the payload buffer, "B," 602 is filled with statically encrypted data 110 and dynamically encrypted data 114 that is retrieved via the input channel, "F," 608 as shown in element 564. The size of the retrieved data is typically equivalent to the payload size, "p," 606. Elements 606 and 608 are described with reference to FIG. 6.

The present invention detects if a payload buffer, "B," 602 was lost during transmission over the input channel, "F," 608 by determining if the input channel, "F," 610 is unreliable, as shown in element 566. It will be recognized by those skilled in the art that the ability to detect the loss of a data transmission packet 115 (as shown in FIG. 1) over an unreliable channel can be accomplished by techniques known in the art. For example, data transmission packet 115 loss can be determined by including a sequence number with each data transmission packet 115 and comparing sequence numbers of successive data transmission packets 115 to assess transmission continuity. If the input channel, "F," 608 is reliable, the operation moves directly to element 572. Alternately, if the input channel, "F," 608 is an unreliable channel, as shown in element 566, the present invention extracts the state, "s," 604 from the payload buffer, "B," 602 as shown in element 568.

Further, if there is a data transmission packet 115 loss, as shown in element 570, the present invention uses the saved state, "s," 604 to recover the state of the encrypted information, as shown in element 571. If there is no data transmission packet 115 loss, the operation moves directly to element 572.

The next stage in the algorithm decrypts the payload buffer, "B," 602 as shown in element 572. As illustrated in elements 320 and 326 (as shown in FIG. 3) decryption may occur entirely in hardware or through a combination of hardware and software components. Those skilled in the art will appreciate that hardware components may operate faster than software components but do not accommodate quick changes to the operation method. Decryption is performed in the reverse order of the order of encryption. That is, as shown in element 574, the payload buffer, "B," 602 is first decrypted using the last-encrypted dynamic key 112. The present invention continues to decrypt the payload buffer, "B," 602 working with encryption keys in reverse order. Then, as shown in element 576, the present invention uses the static key 108 to decrypt the payload buffer, "B," 602. As shown in element 578, once the payload buffer, "B," 602 is decrypted, it is written to the output channel, "F," 608.

This process repeats, as shown in element 562, until the encrypted input has been decrypted. Once the decryption is complete the process terminates, as shown in element 580, by closing the input channel, "N," 608 and output channel, "F," 610. Finally, the processing is terminated, as shown in element 582.

FIG. 6 is a block diagram that describes the elements used with reference to the method of initialization (as shown in FIG. 5A). Now referring to FIG. 6, element 600 includes the initialization elements. The payload buffer, "B," 602 is a collection of data elements that is transmitted between computer systems. Information useful in transforming and storing the data 103 (as shown in FIG. 1), such as metadata, may be extracted prior to encrypting and decrypting the data 103. For example the state, "s," 604 is required if the data 103 is transmitted over an unreliable channel.

Also, the size of the payload buffer, "p," 606 is used to facilitate manipulation of the payload buffer, "B," 602. The size of the payload buffer, "p," 606 represents the size of the data 103 that will be encrypted or decrypted, and may be established by an administrator of the data server 102 (as shown in FIG. 1), or may be related to the type of output channel that is available. For example, when the output channel is an Internet Protocol Socket operating over an Ethernet connection, an efficient size for the payload buffer, "p," 606 is the size that can be transported in a single Ethernet data transmission packet 115 (as shown in FIG. 1). Those skilled in the art will appreciate the operation of an Internet Protocol Socket and the Ethernet.

The input channel, "F," 608 is established as part of the method of initialization 510. The input channel, "F," 608 enables receipt of encrypted or decrypted information. The output channel, "N," 610 is also established as part of the method of initialization 510. The output channel, "N," 610 enables transmission of encrypted or decrypted information. It will be appreciated by those skilled in the art that an input channel and an output channel may be a digital data file that represents the encrypted data 103, a data transmission device 117 (as shown in FIG. 1), or any other device suitable for transmitting encrypted information between computer systems.

This concludes the description of the invention. The following describes some alternative embodiments for accomplishing the present invention. For example, any type of computer system such as a mainframe, minicomputer, or personal computer, or computer configuration such as a timesharing mainframe, LAN, or standalone personal computer could be used with the present invention.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims appended hereto.

From the foregoing it will be appreciated that the present invention novelly accelerates encryption and decryption of a data element using both a static key and a dynamic key by eliminating decryption of the data prior to encryption with the dynamic key. The present invention enables end-to-end security and rapid alteration of the encryption key. By operating more efficiently, the present invention may apply the saved computer resources to enabling stronger dynamic encryption than in the past. Further, the need for trusted data servers to transmit the data is also eliminated.

TRADEMARKS

IBM is a trademark or registered trademark of International Business machines, Corporation in the United States and other countries.

Tivoli is a trademark or registered trademark in the United States and other countries. Tivoli Systems Inc. is an IBM company.

Tivoli® SecureWay® is a trademark or registered trademark of Tivoli Systems Inc.

MPEG is a trademark or registered trademark of Philips Electronics N.V.

We claim:

1. A computer implemented method for encrypting and decrypting using a first key and a second key, comprising:
   encrypting said data element with said first key and a current encryption state to produce a first encrypted data and an updated, encryption state;
   encrypting said first encrypted data with said second key to produce a second encrypted data;
   transmitting said second encrypted data with said current encryption state to a receiving computer system;
   encrypting a subsequent data element with said first key and said updated encryption state to produce a subsequent first encrypted data and a subsequent updated encryption state;
   encrypting said subsequent first encrypted data with said second key to produce a subsequent second encrypted data;
   transmitting said subsequent second encrypted data with said updated encryption state to a receiving computer system;
   decrypting, on said receiving computer system, said subsequent second encrypted data with said second key to produce a decrypted subsequent second encrypted data; and
   decrypting said decrypted subsequent second encrypted data with said first key and said updated encryption state transmitted with said subsequent second encrypted data to produce a decrypted subsequent data element.

2. The method of claim 1, wherein said encrypting said data element with said first key strongly encrypts said data element with said first key; and wherein said encrypting said subsequent data element with said first key strongly encrypts said subsequent data element with said first key.

3. The method of claim 1, wherein said encrypting said first encrypted data with said second key weakly encrypts said first encrypted data with said second key; wherein said encrypting said subsequent first encrypted data with said second key weakly encrypts said subsequent first encrypted data with said second key.

4. The method of claim 1,
   wherein said encrypting said data element with said first key is on a first computer system;
   wherein said encrypting said subsequent data element with said first key is on said first computer system;
   further comprising: transmitting said first encrypted data and said current encryption state from said first computer system to a second computer system; and transmitting said subsequent first encrypted data and said updated encryption state from said first computer system to said second computer system;
   wherein said encrypting said first encrypted data with said second key is on said second computer system,
   wherein said encrypting said subsequent first encrypted data with said second key is on said second computer system, said second computer system being untrusted; and
   thereby distributing encryption and decryption between said first computer system, said second
   computer system, and said receiving computer system.

5. The method of claim 1,
   wherein said encrypting said data element with said first key is on a first computer system;
   wherein said encrypting said subsequent data element with said first key is on said first computer system;
   wherein said encrypting said first encrypted data with said second key is on said first computer system;
   wherein said encrypting said subsequent first encrypted data with said second key is on said first computer system; and
   thereby distributing encryption and decryption between said first computer system and said receiving computer system.

6. The method of claim 1 wherein said data element comprises digital data representing audio and video information.

7. The method of claim 1, wherein said transmitting said second encrypted data transmits a packet comprising said second encrypted data with said current encryption state to said receiving computer system;
   wherein said transmitting said subsequent second encrypted data transmits a subsequent packet comprising said subsequent second encrypted data with said updated encrypted state to said receiving computer system; and
   further comprising:
      determining, on said receiving computer system, whether a transmission failure occurred based on identifying a loss of said packet comprising said second encrypted data;
      in response to said determining, performing said decrypting, on said receiving computer system, said subsequent second encrypted data; and said decrypting, on said receiving computer system, said decrypted subsequent second encrypted data.

8. The method of claim 1 further comprising:
   determining, on said receiving computer system, whether transmission of said second encrypted data failed;
   performing, on said receiving computer system, in response to said determining, said decrypting said subsequent second encrypted data with said second key, and said decrypting said decrypted subsequent second encrypted data with said first key and said updated encryption state transmitted with said subsequent second encrypted data.

9. The method of claim 8 wherein said second encrypted data of said failed transmission is not retransmitted.

10. The method of claim 8 wherein said second encrypted data of said failed transmission is not recovered.

11. The method of claim 8 wherein said second encrypted data of said failed transmission is corrupt.

12. An article of manufacture comprising a program storage medium readable by a computer and embodying one or more instructions executable by the computer for causing a computer system to encrypt and decrypt using a first key and a second key, comprising:
   encrypting a data element with said first key and a current encryption state to produce a first encrypted data and an updated encryption state;
   encrypting said first encrypted data with said second key to produce a second encrypted data;
   transmitting said second encrypted data with said current encryption state to a receiving computer system;
   encrypting a subsequent data element with said first key and said updated encryption state to produce a subsequent first encrypted data and a subsequent updated encryption state;
   encrypting said subsequent first encrypted data with said second key to produce a subsequent second encrypted data;
   transmitting said subsequent second encrypted data with said updated encryption state to said receiving computer system;

decrypting, on said receiving computer system, said subsequent second encrypted data with said second key to produce a decrypted subsequent second encrypted data; and decrypting said decrypted subsequent second encrypted data with said first key and said updated encryption state transmitted with said subsequent second encrypted data to produce a decrypted subsequent data element.

13. The article of manufacture of claim 12 wherein said encrypting said data element with said first key strongly encrypts said data element with said first key, wherein said encrypting said subsequent data element with said first key strongly encrypts said subsequent data element with said first key.

14. The article of manufacture of claim 12 wherein said encrypting said first encrypted data with said second key weakly encrypts said first encrypted data with said second key; and wherein said encrypting said subsequent first encrypted data with said second key weakly encrypts said subsequent first encrypted data with said second key.

15. The article of manufacture of claim 12, wherein said encrypting said data element with said first key is on a first computer system;

wherein said encrypting said subsequent data element with said first key is on said first computer system;

further comprising:

transmitting said first encrypted data and said current encryption state from said first computer system to a second computer system; and transmitting said subsequent first encrypted data and said updated encryption state from said first computer system to said second computer system;

wherein said encrypting said first encrypted data with said second key is on said second computer system, said second computer system being untrusted;

wherein said encrypting said subsequent first encrypted data with said second key is on said second computer system; and thereby distributing encryption and decryption between said first computer system, said second computer system, and said receiving computer system.

16. The article of manufacture of claim 12, wherein said encrypting said data element with said first key is on a first computer system;

wherein said encrypting said first encrypted data with said second key is on said first computer system;

wherein said encrypting said subsequent data element with said first key is on said first computer system;

wherein said encrypting said subsequent first encrypted data with said second key is on said first computer system; and thereby distributing encryption and decryption between said first computer system and said receiving computer system.

17. The article of manufacture of claim 12 wherein said data element comprises digital data representing audio and video information.

18. The article of manufacture of claim 12, wherein said transmitting said second encrypted data transmits a packet comprising said second encrypted data with said current encryption state to said receiving computer system;

wherein said transmitting said subsequent second encrypted data transmits a subsequent packet comprising said subsequent second encrypted data with said updated encryption state to said receiving computer system; and further comprising:

determining, on said receiving computer system, whether a transmission failure occurred based on identifying a loss of said packet comprising said second encrypted data;

in response to said determining, performing said decrypting, on said receiving computer system, said subsequent second encrypted data; and said decrypting, on said receiving computer system, said decrypted subsequent second encrypted data.

19. A computer implemented method for encrypting and decrypting using a first key and a second key, wherein a data element is partitioned into chunks, comprising:

encrypting said a data element chunk with said first key and a current encryption state to provide a first encrypted chunk data and an updated encryption state;

encrypting a subsequent data element chunk with said first key and said updated encryption state to provide a subsequent first encrypted chunk data and a subsequent updated encryption state;

encrypting said first encrypted chunk data with said second key to provide second encrypted chunk data;

transmitting said second encrypted chunk data and said current encryption state to a receiving computer system;

encrypting said subsequent first encrypted chunk data with said second key to provide subsequent second encrypted chunk data;

transmitting said subsequent second encrypted chunk data and said updated encryption state to said receiving computer system;

decrypting said subsequent second encrypted chunk data with said second key; and decrypting said decrypted subsequent second encrypted chunk data with said first key and said updated encryption state that is transmitted with said subsequent second encrypted chunk data to provide a decrypted subsequent data element chunk.

20. The method of claim 19 wherein said encrypting said data element chunk with said first key strongly encrypts said data element chunk with said first key, and wherein said encrypting said subsequent data element chunk with said first key strongly encrypts said subsequent data element chunk with said first key.

21. The method of claim 19 wherein said encrypting said first encrypted chunk data with said second key weakly encrypts said first encrypted chunk data with said second key, and wherein said encrypting said subsequent first encrypted chunk data with said second key weakly encrypts said subsequent encrypted chunk data with said second key.

22. The method of claim 19, wherein said encrypting said data element chunk with said first key is on a first computer system;

wherein said encrypting said subsequent data element chunk with said first key is on said first computer system;

further comprising:

transmitting said first encrypted chunk data and said current encryption state to a second computer system; and transmitting said subsequent first encrypted chunk data and said updated encryption state to said second computer system;

wherein said encrypting said first encrypted chunk data with said second key is on said second computer system, wherein said encrypting said subsequent first encrypted chunk data with said second key is on said second computer system, second computer system being untrusted; and thereby distributing encryption between said first computer system and said second computer system.

23. The method of claim 19, wherein said encrypting said data element chunk with said first key is on a first computer system;

wherein said encrypting said subsequent data element chunk with said first key is on said first computer system;

wherein said encrypting said second encrypted chunk data with said second key is on said first computer system;

wherein said encrypting said subsequent second encrypted chunk data with said second key is on said first computer system.

24. The method of claim 19, further comprising:

determining, on said receiving computer system, whether a transmission failure of said second encrypted chunk data occurred; wherein in response to said transmission failure said second encrypted chunk data associated with said failed transmission is not retransmitted.

25. An article of manufacture comprising a program storage medium readable by a computer and embodying one or more instructions executable by the computer for causing a computer system to encrypt and decrypt using a first key and a second key, wherein a data element is partitioned into chunks, comprising:

encrypting a data element chunk with said first key and a current encryption state to produce a first encrypted chunk data and an updated encryption state;

encrypting a subsequent data element chunk with said first key and said updated encryption state to produce a subsequent first encrypted chunk data and a subsequent updated encryption state;

encrypting said second encrypted chunk data with said second key to produce a second encrypted chunk data;

encrypting said subsequent second encrypted chunk data with said second key to produce a subsequent second encrypted chunk data;

transmitting said second encrypted chunk data with said current encryption state to a receiving computer system;

transmitting said subsequent encrypted chunk data with said updated encryption state to said receiving computer system;

decrypting said subsequent second encrypted chunk data with said second key; and decrypting said decrypted subsequent second encrypted chunk data with said first key and said updated encryption state that is transmitted with said subsequent second encrypted chunk data.

26. The article of manufacture of claim 25 wherein said encrypting said data element chunk said first key weakly encrypts said data element chunk with said first key, wherein said encrypting said subsequent data element chunk with said first key weakly encrypts said subsequent data element chunk with said first key.

27. The article of manufacture of claim 25 wherein said encrypting said data element chunk with said second key weakly encrypts said data element chunk with said second key, wherein said encrypting said subsequent data element chunk with said second key weakly encrypts said subsequent data element chunk with said second key.

28. The article of manufacture of claim 25, wherein said encrypting said data element chunk with said first key is on a first computer system;

wherein said encrypting said subsequent data element chunk with said first key is on said first computer system;

further comprising:

transmitting said first encrypted chunk data to a second computer system;

transmitting said subsequent first encrypted chunk data to said second computer system;

wherein said encrypting said first encrypted chunk data with said second key is on said second computer system, said second computer system being untrusted;

wherein said encrypting said subsequent first encrypted chunk data with said second key is on said second computer system; and thereby distributing encryption between said first computer system and said second computer system.

29. The article of manufacture of claim 28, further comprising: determining when transmission of said second encrypted chunk data from said first computer system to said second computer system failed; and in response to said determining, performing, on said first computer system, said decrypting said subsequent second encrypted chunk data and said decrypting said decrypted subsequent second encrypted chunk data thereby recovering said decrypting without retransmission of said second encrypted chunk data.

30. The article of manufacture of claim 25, wherein said encrypting said data element with said first key is on a first computer system;

wherein said encrypting said subsequent data element chunk with said first key is on said first computer system;

wherein said encrypting said first encrypted chunk data with said second key is on said first computer system; and wherein said encrypting said subsequent first encrypted chunk data with said second key is on said first computer system.

31. A computer implemented method for encrypting and decrypting using a first key and a second key, comprising:

encrypting a data element with said first key to produce a first encrypted data;

encrypting said first encrypted data with said second key and a current encryption state to produce a second encrypted data and an updated encryption state;

transmitting said second encrypted data with said current encryption state to a receiving computer system;

encrypting a subsequent data element with said first key to produce a subsequent first encrypted data;

encrypting said subsequent first encrypted data with said second key and said updated encryption state to produce a subsequent second encrypted data and another updated encryption state;

transmitting said subsequent second encrypted data with said updated encryption state to a receiving computer system;

decrypting, on said receiving computer system, said subsequent second encrypted data with said second key and said updated encryption state that is transmitted with said second encrypted data; and decrytping, on said receiving computer system, said decrypted subsequent second encrypted dats with said first key.

32. The method of claim 31,
wherein said encrypting said data element with said first key to produce said first encrypted data is also based on a first-encryption encryption state to produce said first encrypted data and an updated first-encryption encryption state;
wherein said transmitting said second encrypted data with said current encryption state also transmits said first-encryption encryption state;
wherein said encrypting said subsequent data element with said first key to produce said subsequent first encrypted data is also based on said updated first-encryption encryption state to produce said subsequent first encrypted data and an updated subsequent first-encryption encryption state;
wherein said transmitting said subsequent second encrypted data with said updated encryption state also transmits said updated first-encryption encryption state; and
wherein, on said receiving computer system said decrypting said decrypted subsequent second encrypted data with said first key is also based on said updated first-encryption encryption state that is transmitted with said subsequent second encrypted data to produce said decrypted subsequent data element.

33. The method of claim 31,
wherein said encrypting said data element with said first key is on a first computer system;
wherein said encrypting said subsequent data element with said first key is on said first computer system;
further comprising: transmitting said first encrypted data with said current encryption state and said subsequent first encrypted data with said updated encryption state from said first computer system to a second computer system;
wherein said encrypting said first encrypted data with said second key is on said second computer system, wherein said encrypting said subsequent first encrypted data is on said second computer system, said second computer system being untrusted; and
thereby distributing encryption and decryption between said first computer system, said second computer system, and said receiving computer system.

34. The method of claim 31 further comprising:
determining, on said receiving computer system, whether transmission of said second encrypted data failed; and
performing on said receiving computer system, in response to said determining, said decrypting said subsequent second encrypted data with said second key and said updated encryption state transmitted with said subsequent second encrypted data; and said decrypting said decrypted subsequent second encrypted data with said first key.

35. The method of claim 34 wherein said second encrypted data of said failed transmission is not retransmitted.

36. The method of claim 34 wherein said second encrypted data of said failed transmission is not recovered.

37. An article of manufacture comprising a program storage medium readable by a computer and embodying one or more instructions executable by the computer for causing a computer system to encrypt and decrypt using a first key and a second key, comprising:
encrypting a data element with said first key to produce a first encrypted data;
encrypting said first encrypted data with said second key and a current encryption state to produce a second encrypted data and an updated encryption state;
transmitting said second encrypted data with said current encryption state to a receiving computer system;
encrypting a subsequent data element with said first key to produce a subsequent first encrypted data;
encrypting said subsequent first encrypted data with said second key and said updated encryption state to produce a subsequent second encrypted data and another updated encryption state;
transmitting said subsequent second encrypted data with said updated encryption state to a receiving computer system;
decrypting, on said receiving computer system, said subsequent second encrypted data with said second key and said updated encryption state that is transmitted with said second encrypted data; and
decrypting, on said receiving computer system, said decrypted subsequent second encrypted data with said first key.

38. The article of manufacture of claim 37
wherein said encrypting said data element with said first key to produce said first encrypted data is also based on a current first-encryption encryption state to produce said first encrypted data and an updated first-encryption encryption state;
wherein said transmitting said second encrypted data with said current encryption state also transmits said current first-encryption encryption state;
wherein said encrypting said subsequent data element with said first key to produce said subsequent first encrypted data is also based on said updated first-encryption encryption state to produce said subsequent first encrypted data and a subsequent updated first-encryption encryption state;
wherein said transmitting said subsequent second encrypted data with said updated encryption state also transmits said updated first-encryption encryption state; and
wherein, on said receiving computer system said decrypting said decrypted subsequent second encrypted data with said first key is also based on said updated first-encryption encryption state that is transmitted with said subsequent second encrypted data to produce said decrypted subsequent data element.

39. The article of manufacture of claim 37,
wherein said encrypting said data element with said first key is on a first computer system;
wherein said encrypting said subsequent data element with said first key and said current encryption state is on said first computer system;
further comprising:
transmitting said first encrypted data from a first computer system to a second computer system; and
transmitting said subsequent first encrypted data from said first computer system to said second computer system;
wherein said encrypting said first encrypted data with said second key is on said second computer system, said second computer system being untrusted; and
wherein said encrypting said subsequent first encrypted data with said second key is on said second computer system; and thereby distributing encryption and decryption between said first computer system, said second computer system, and said receiving computer system.

40. The article of manufacture of claim 37 further comprising:
determining, on said receiving computer system, whether transmission of said second encrypted data failed; and
in response to said determining, performing on said receiving computer system, said decrypting said subsequent second encrypted data with said second key and said updated encryption state transmitted with said subsequent second encrypted data, and said decrypting said decrypted subsequent second encrypted data with said first key.

41. The article of manufacture of claim 40 wherein said second encrypted data of said failed transmission is not retransmitted.

42. The article of manufacture of claim 40 wherein said second encrypted data of said failed transmission is not recovered.

* * * * *